(12) United States Patent
Kopylovitz

(10) Patent No.: US 6,484,269 B1
(45) Date of Patent: Nov. 19, 2002

(54) DATA STORAGE SYSTEM AND METHOD WITH IMPROVED DATA INTEGRITY VALUE CALCULATION

(75) Inventor: Haim Kopylovitz, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/556,205

(22) Filed: Nov. 9, 1995

(51) Int. Cl.$^7$ ................................................ G06F 11/00
(52) U.S. Cl. ...................... 714/5; 714/6; 714/7; 714/52; 714/54
(58) Field of Search ............................ 714/6, 5, 52, 54, 714/7, 764, 805, 770, 755, 763, 787, 756, 716, 752, 758, 807, 702

(56) References Cited

U.S. PATENT DOCUMENTS

| | | | | |
|---|---|---|---|---|
| 5,191,584 A | * | 3/1993 | Anderson | 371/51.1 |
| 5,630,054 A | * | 5/1997 | Trang | 395/185.05 |
| 5,659,677 A | * | 8/1997 | Cohn et al. | 395/182.04 |

* cited by examiner

Primary Examiner—Ly V. Hua

(74) Attorney, Agent, or Firm—Fish & Richardson P.C.

(57) ABSTRACT

A data storage system and data storage method providing data storage devices including a data integrity value generator, for allowing individual data storage devices to compute data integrity values in a decentralized manner. A data storage system includes at least one data storage device having a data integrity value generator. A data integrity value generator is responsive to at least first and second data elements, for calculating a data integrity value. In the preferred embodiment, the first and second data elements utilized by the data integrity value generator of a data storage device includes new data received from a data source and old data stored at a predetermined data storage location on the data storage device. The method of the invention includes providing a first data storage device having a data integrity value generator, receiving by the data storage device at least a first data element, and calculating the data integrity value by the data integrity value generator in response to a received data element and a data element stored on the data storage device. The method also includes re-building a lost or faulty data element by starting with a known data element or data integrity value, computing a data integrity value in conjunction with a known storage intermediary data value, computing a new data integrity value to a second and subsequent data storage device which will compute another intermediary data integrity value with data stored on the second and subsequent data storage devices to provide at a re-built lost or faulty data element.

14 Claims, 4 Drawing Sheets

DATA STORAGE SYSTEM AND METHOD WITH IMPROVED DATA INTEGRITY VALUE CALCULATION

FIELD OF THE INVENTION

This invention relates to data storage systems and more particularly, to a system and method for providing enhanced data storage system performance by de-centralizing data integrity value calculation.

BACKGROUND OF THE INVENTION

During recent years, computer scientists and data processing professionals, particularly those involved with the development of data storage systems, have developed guideline and benchmarks for data storage systems and data storage system data integrity or reliability. These guidelines or benchmarks have evolved as multiple "levels" of data integrity.

The most common of these levels or benchmarks is most commonly referred to as "RAID" (Redundant Array of Inexpensive Disks). The various "levels" of RAID data protection or integrity are numbered 0 through 6 with RAID level 0 indicating that a particular data storage system has no mechanism providing data integrity or redundancy, while a RAID level 6 system is generally thought to provide the highest level of data protection currently developed.

As manufacturers of data storage systems develop new products, and as users of data storage systems evaluate their needs and specify the product(s) they wish to purchase, the manufacturing or purchasing specifications may include a reference to a RAID level or levels that a particular piece of equipment must meet or a given purchaser wishes to purchase.

Although the various RAID levels are designed to provide different levels of data integrity or protection, the development of the various levels. of RAID and other similar standards and protocols have often ignored system throughput by creating bottlenecks in one or more pieces of hardware or software in order to implement the desired degree of data integrity or redundancy. Additionally, RAID as well as other standards and protocols have not accounted and allowed for a user to upgrade this level of data protection by subsequently changing from one level of protection to another. In some instances, the data integrity or redundancy protocol or standard imposes a bottleneck on data throughput. For example, RAID level 5, requires that a central controller perform all of the data integrity checking. Thus, no matter how fast the data can be transferred between a host or other source of data and a data storage system controller, or a data storage device such as a disk drive and data storage device controller, all the data integrity value computations (such as parity, CRC, etc.) are performed at the controller level.

Further, in those situations where a particular data protocol or standard, such as RAID level 5, is established and followed, if more than one data storage device fails, all data in the group will be lost given that data is striped across multiple drives.

SUMMARY OF THE INVENTION

Accordingly, the present features a system and method for storing data on a data storage device which is part of a data storage system which maintains a high level of data integrity while simultaneously providing an improved level of performance. An improved level of performance is achieved by minimizing the bottleneck of data processing in one centralized location, which allows the user to easily, quickly and very simply migrate previously stored data from one level of data protection to another level of data protection. The system enhances data integrity level in a short period of time and transparent to the user.

This invention features a data storage system that improves data integrity value calculation performance and a method for accomplishing the same. The invention includes a data storage system which receives data to be stored on at least a first data storage device. The first data storage device includes a data integrity value generator, which is responsive to a received data element and to a data element previously stored on the data storage device, for calculating a data integrity value.

In the preferred embodiment, the data integrity value generator includes an exclusive-or generator. The exclusive-or generator calculates a data integrity value in response to a received data element to be stored at a predetermined data storage device storage location on the data storage device, and a data. element previously stored at the predetermined data storage device data storage location on the data storage device.

Once the data integrity value is calculated, the data integrity value can be stored on the data storage device itself, or provided to another data storage device for storing, in which case only the received data element is stored on the first data storage device.

The system may include a plurality of data storage devices each having a data integrity value generator. The plurality of data storage devices may be coupled to a data storage device controller which receives the data elements to be stored on the data storage system from a source of data such as one or more host computers or a data network.

The present invention also includes a method of computing a data integrity value for data to be stored on the data storage system including the steps of providing at least a first data storage device having a data integrity value generator. The first data storage device receives at least one data element, and responsive to at least the received data element, calculates the data integrity value for that data element. The data element includes actual data to be written to the data storage device, such as a disk drive, or a previously computed data integrity value computed by another data storage device's data integrity value generator.

A plurality of data storage devices may be coupled together or to a data storage device controller, although each of the plurality of data storage devices includes a data integrity value generator.

The present invention also features a method of re-building or re-constructing data determined to be faulty or defective.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
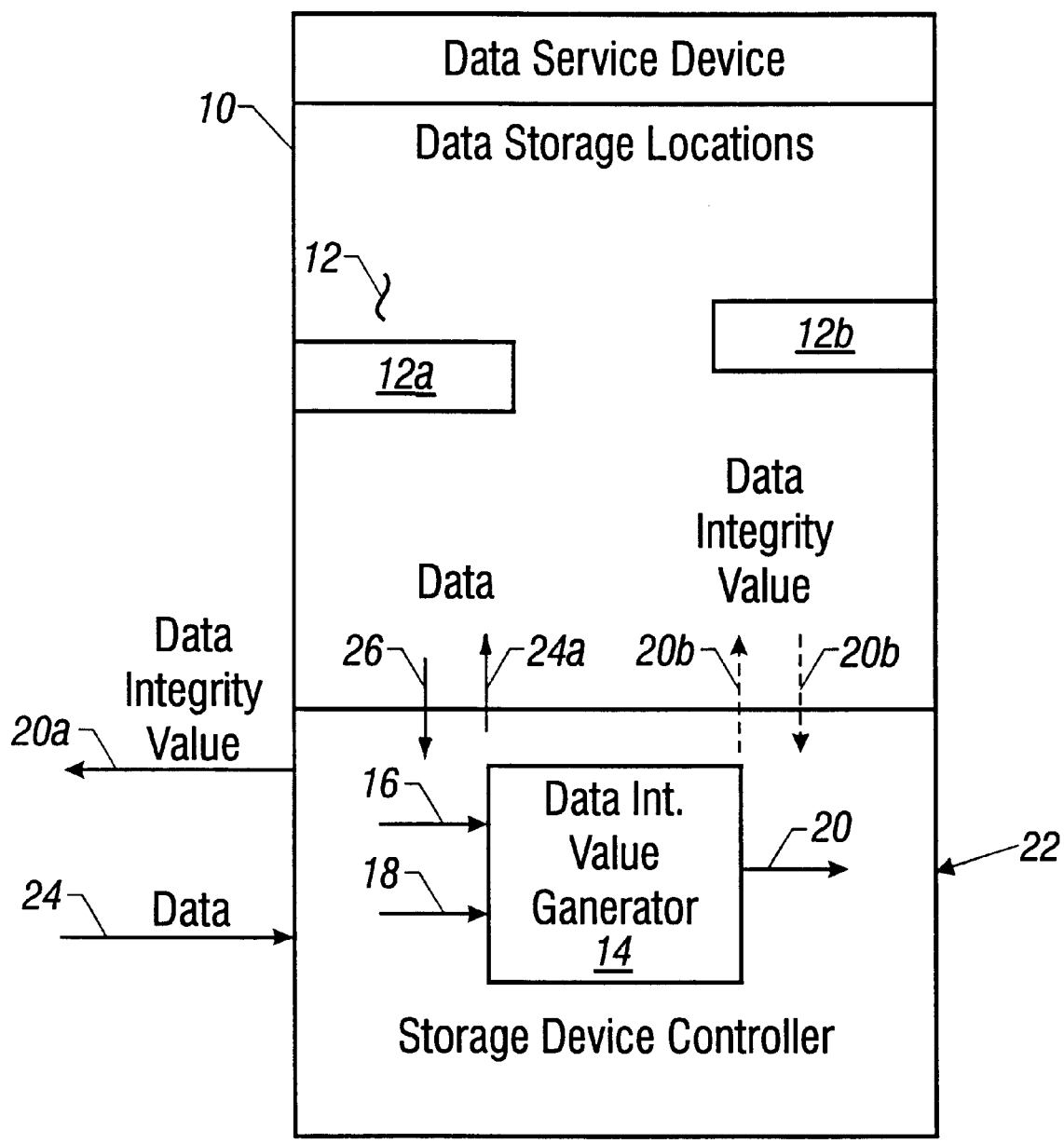
FIG. 1 is a schematic representation of a data storage device having an integral data integrity value generator according to one aspect of the present invention.

The present invention features a data storage system, for receiving data to be stored on at least one data storage device 10, FIG. 1. In a first embodiment, the data storage device 10 includes a plurality of data storage locations 12 in which may be stored a plurality of data elements. In the preferred embodiment, the data storage device is a disk drive, such as a fixed block architecture (FBA) 3½" or 5¼" disk drive, as is well known to those skilled in the art.

In accordance with the present invention, the at least one data storage device 10 includes a data integrity value generator 14 as part of the data storage device itself 10, unlike the prior art wherein a data integrity value generator is located centrally and remotely from the data storage device, such as in a central controller. The preferred embodiment of the present invention contemplates that the data integrity value generator is an exclusive-or generator well known to those skilled in the art, although other types of data integrity value generators are considered to be within the scope of the present invention. Such an exclusive-or generator is widely available as an integrated circuit from a number of manufacturers as is well known in the art.

The data integrity value generator 14 utilizes first and second inputs 16, 18 respectively, to calculate a data integrity value 20 whose use will be described in greater below.

In the preferred embodiment, the data storage device 10 further includes a storage device controller portion 22 which receives data 24 from a data source, such as a data processing device including one or more host computers or a data network, and generally controls the storage of data 24 to one or more data storage locations 12. An example of a data storage device 10 in accordance with the present invention is a model Elite 9 disk drive available from the Seagate Company.

In the preferred embodiment, data 24 received by the data storage device 10 destined to be stored in one or more predetermined data storage location 12a is provided as the first input 16 to the data integrity value generator 14. Data 26 previously stored in the corresponding data storage device storage location 12a to which the received data element 24 is to be written and stored is provided as the second input 18 to the data integrity value generator 14. Using the received data 24 and the previously stored data 26 retrieved from the predetermined data storage device storage location 12a, data integrity value generator 14 computes a data integrity value 20.

In one embodiment, the data integrity value 20 is provided to an external device such as another data storage device as data integrity value 20a. In yet another embodiment, the data integrity value 20b is stored at a predetermined data storage device storage location 12b on the data storage device 10 itself. In this embodiment, a previously computed and stored data integrity value 20b is utilized as the second input 18 to the data integrity value generator 14 in conjunction with received data 24.

As an additional feature of this embodiment, the data storage device 10 may receive data 24 from a data source such as a host computer or another data storage device 10. Such received data 24 may include a previously computed data integrity value, as will be explained in greater below.

Once the data integrity value 20 has been generated, the storage device controller 22 stores the received data element 24a in the predetermined data storage location 12a on the data storage device 10 and provides the computed data integrity value 20 to another data storage device directly, or through a data storage system controller.

Figure 2:
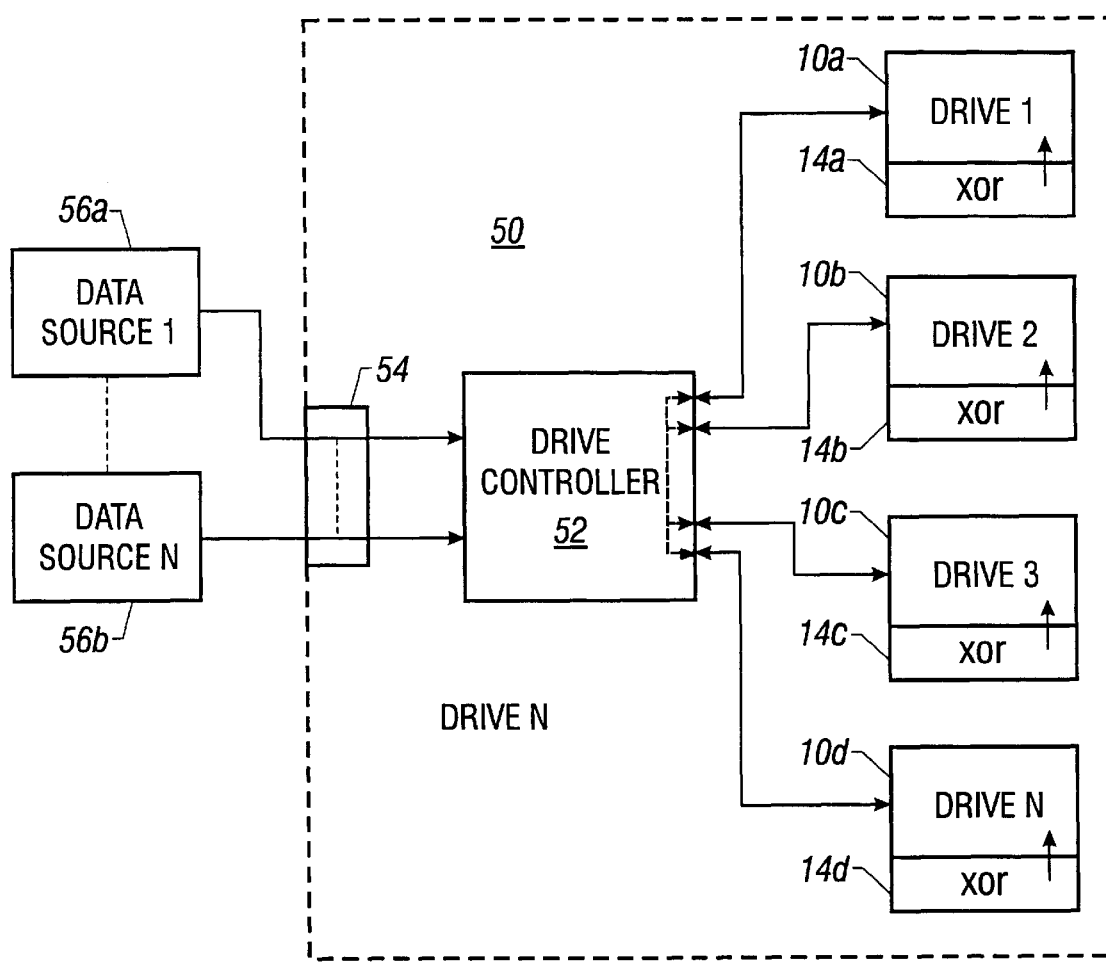
FIG. 2 is a schematic representation of a data storage system coupled to one or more data sources, wherein the data storage system includes a plurality of data storage devices including a data integrity value generator, each data storage device coupled to a data storage device controller.

In yet another embodiment, a data storage system 50, FIG. 2, according to the present invention includes a plurality of data storage devices 10a–10d, such as disk drives, coupled to a central or common data storage device (disk) controller 52. In addition to being coupled to each of the data storage devices 10a–10d, the data storage device controller 52 is also coupled to a data channel controller 54, well known in the art as a "channel adapter", which in turn is coupled to one or more data sources 56a, 56b such as host computers, data networks, or the like.

An example of a data storage system 50 including a disk adapter or controller 52 and a channel adapter 54 is a Symmetrix data storage system available from EMC Corporation, the Assignee of the present invention, which description of such a system is fully incorporated herein by reference.

In this embodiment, data storage device controller 52 receives data to be stored on one or more of data storage devices 10a–10d. Using the data storage system 50 of the present invention, any one of the pre-established RAID levels or any new RAID or similar data storage system data integrity or security level can be implemented.

For example, in a data storage system 50 implementing RAID level 4, large blocks of data are striped across a number of data storage devices 10, such as data storage devices 10a–10c, while one data storage device, such as data storage device 10d, is used to store data integrity values, such as parity information. In this example, performance of traditional RAID level 4 can be significantly enhanced by decentralizing the data integrity value generation from the data storage device controller 52, as in the prior art, to the individual data storage devices 10a–10d.

In this example, data storage device controller 52, implementing RAID level 4, stripes or breaks up large data blocks to the individual data storage devices 10a–10c. Individual data storage devices 10a–10c compute a data integrity value, such as an exclusive-or generated "parity" or "check-sum" value, utilizing integral data integrity value generators 14a–14c respectively. The computed data integrity values can then be routed through data storage device controller 52, to a data storage device 10d which is utilized to store all of the data integrity values, either unaltered or by creating a data integrity value for each and every one of the provided data integrity values from the other data storage devices 10a–10c.

In yet another example wherein data storage device controller 52 is implementing RAID level 5 which performs data block striping with non-dedicated integrity value disks (some parity is stored on each disk), as the data is provided to each of the individual data storage devices 10a–10d, a data integrity value, such as parity, is generated by the data storage devices and stored directly on the individual data storage devices 10a–10d.

The present invention is not limited to previously defined RAID levels but rather, is useful in any type of data storage system wherein data integrity/security value generation may be performed using the data storage system including data storage devices having an integral data integrity value generator in accordance with the present invention.

Multiple data storage device controllers 52 coupled to respective pluralities of data storage devices 10 may be used to provide a data storage system 50 implementing multiple various levels of RAID or other data integrity schemes. Indeed, data storage system users can migrate from data storage systems using mirrored data storage devices to non-mirrored data storage devices simply and efficiently.. Most importantly, the present invention greatly improves data storage system performance by reducing the number of input/output transfers that must occur between a data storage device controller 52 and a data storage device 10 during normal 'write' operations.

By way of example, a prior RAID level 4 standard "write" operation requires five steps including two "read" operations and two "write" operations. For example, once new data is received from the data source, the data storage device controller is required to command a particular data storage device to read data previously stored at the predetermined data storage device storage location at which the new data is to be stored (step 1), followed by issuing a read command to another data storage device to read the parity or data integrity value for that predetermined data storage location (step 2). The data storage device central controller 52 next performs a data integrity value generation utilizing the formula:

new data integrity value=old data integrity value (exclusive-or) old data value (exclusive-or) new data value. (step 3).

Subsequently, the data storage device controller 52 issues a write command to cause the new data to be written to one data storage device (step 4) and the new data integrity value to be written to the data integrity value storage device (step 5).

Accordingly, the generation of a data integrity value, such as parity generation using exclusive-or other similar schemes performed at the data storage device controller level greatly decreases system performance given that the data storage device controller 52 is the "bottleneck" and must itself perform and control each one of the four (4) read and write operations in addition to the data integrity value generation. In summary, for a RAID level 4 data storage system implementation, there are 4 data transfers or I/O operations required.

By de-centralizing or moving the data integrity value generation to the individual data storage devices, the present system greatly improves data storage system throughput and performance, particularly in the case of normal write operations.

Figure 3:
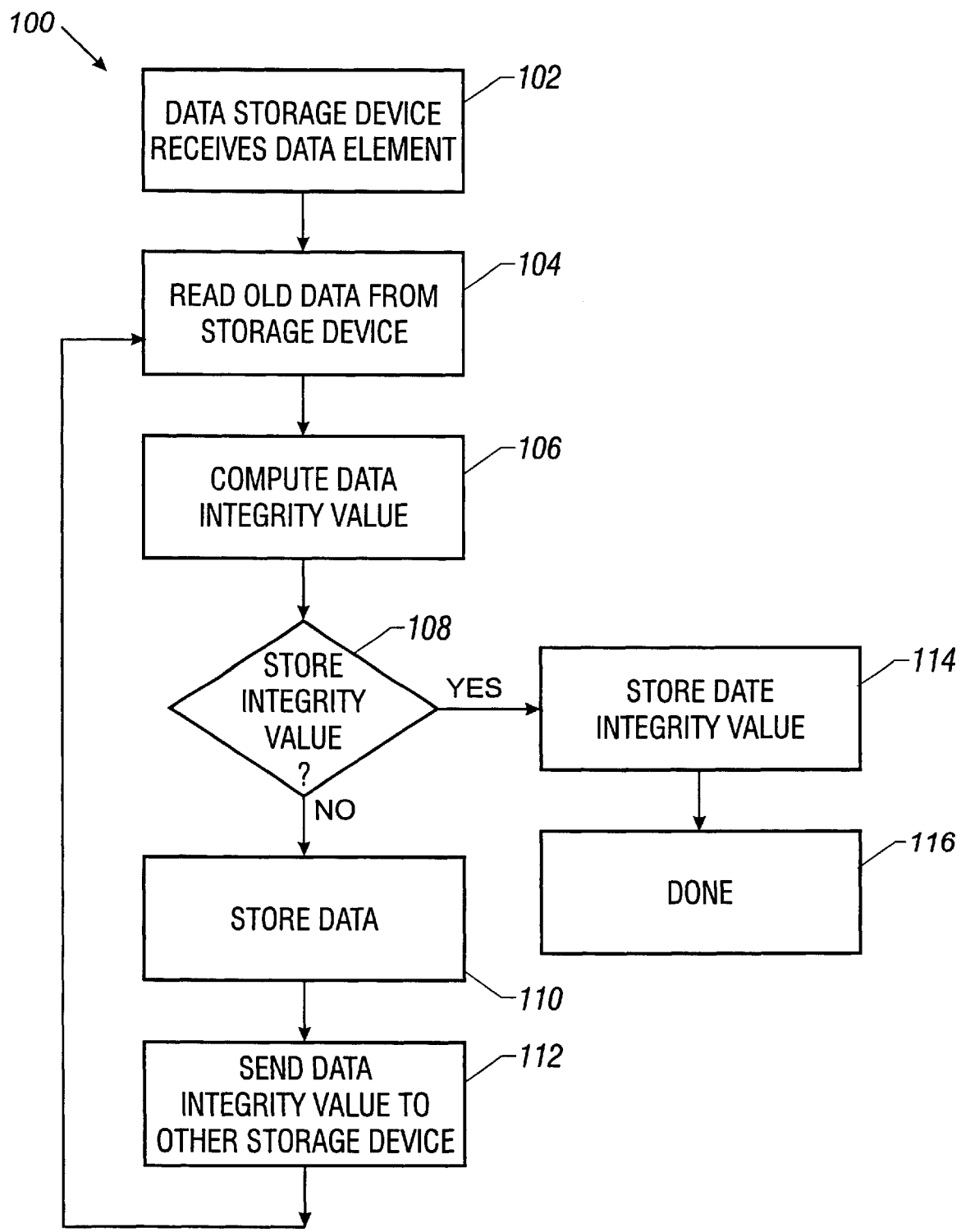
FIG. 3 is a flowchart illustrating the method of computing data integrity values according to one aspect of the present invention.

For example, the present method 100, FIG. 3, of providing a data storage system with enhanced computation of data integrity value requires only 3 data transfers to implement a RAID level 4 data storage system. Once the data storage device 10 receives a data element 24 to be stored, step 102, (first data transfer) the data storage device 10 reads old data stored at the same predetermined data storage location 12*a*, step 104. The data storage device 10 then computes a data integrity value 20, step 106. If the individual data storage device 10 is not going to store the data integrity value 20, step 108, as in a RAID 4 level data storage system implementation, the new data 24 is stored on the data storage device 10, step 110, following which the data integrity value 20*a* is sent to another data storage device 10, step 112, through the data storage device controller (data transfers 2 and 3 respectively).

In the case of the level 4 RAID level implementation, the data storage device 10 storing the data integrity values 20 will read the old data integrity value 20*b* from the storage device, step 104, compute a new data integrity value 20 between the old data integrity value 20*b* and the newly received data or data integrity value 24, step 106, and internally store the newly computer data integrity value 20*b*, step 114, following which processing of the data transfer is complete, step 116.

Even in other RAID level implementations, one or more data transfer steps are saved due to the fact that a data storage device controller need not first perform a read operation from a data storage device to obtain data for computing a data integrity value and writing data and/or data integrity values back to a data storage device. Accordingly, at least one data transfer step is eliminated in each instance.

Figure 4:
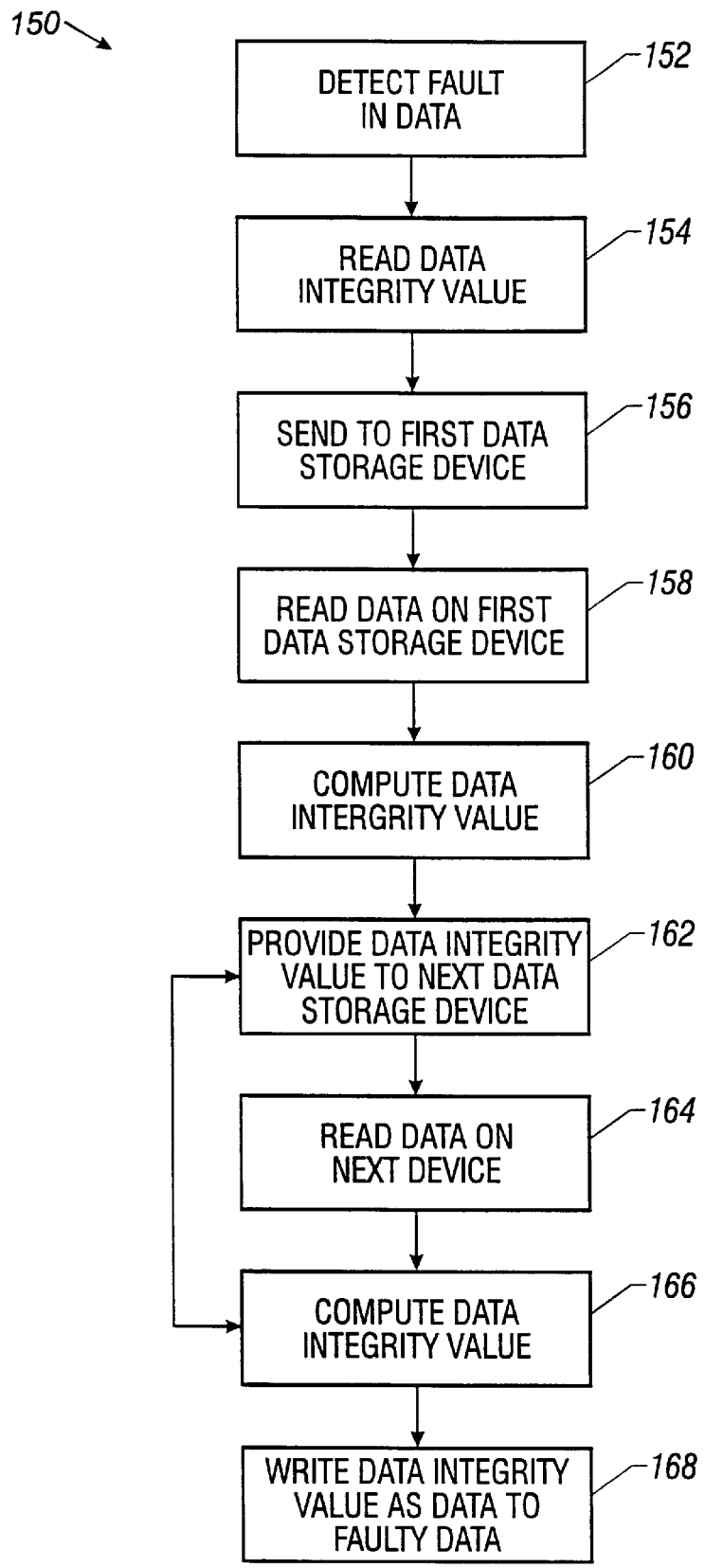
FIG. 4 is a flowchart illustrating the method of recreating faulty or lost data in accordance with yet another feature of the present invention.

Yet another feature of the present invention is the ability of the present data storage system to "re-build or reconstruct" data which has been lost or damaged. The method for re-building lost data 150, FIG. 4, according to one aspect of the present invention includes first detecting a fault in a data element, such as a data storage device 10, step 152. In the present embodiment, the method next includes reading the data integrity value 20*b* for the lost or faulty data element, step 154. Since the data integrity value is generated from multiple data elements, the data integrity value 20*b* read at step 154 is provided to a first data storage device 10, step 156 which reads its corresponding data from a predetermined data storage location 12, step 158, and computes an intermediary data integrity value 20, step 160. The intermediary data integrity value 20 is provided to a second or subsequent data storage device 10, step 162, which reads its data at the predetermined data storage location 12, step 164, following which that individual data storage device 10 computes a second intermediary data integrity value, step 166.

Steps 162–166 will be repeated for each data storage device containing a portion of the typically striped data block with the result being a data value which is the same as the faulty data which must be re-built. The re-built faulty data is then written to a predetermined data storage location 12 on a data storage device 10, step 168. Alternatively, in the case of a Symmetrix data storage system provided by EMC Corporation, the re-built data provided at step 168 may be stored in cache memory or on another data storage device and an indication associated with the re-built data elements that it must be written to the appropriate data storage device once the data storage device is repaired or becomes functional.

Accordingly, the present invention provides a data storage system and method for storing data and computing data integrity values with significantly improved performance by decentralizing computation of data integrity values to the individual data storage devices. Providing individual data storage devices with data integrity value generators reduces, by at least one data transfer, the number of data transfers required between a data storage device and a source of data or a data storage device controller during at least a normal write operation.

Modifications and substitutions by one of ordinary skill in the art are considered to be within the scope of the present invention which is not to be limited except by the claims which follow.

What is claimed is:

1. A data storage system, for receiving data to be stored on at least one data storage device, such data storage system comprising:

a central controller, and a plurality of data storage devices connected to the central controller, each device including a data integrity value generator and a data storage element, said data integrity value a generator responsive to at least first and second data elements, for calculating a data integrity value.

2. The system of claim 1, wherein said data integrity value generator is an "EXCLUSIVE-OR" generator.

3. The system of claim 1, wherein each said data storage element includes a disk drive.

4. The system of claim 1, wherein said first and second data elements are selected from the group consisting of:

received data to be stored at a predetermined data storage device data storage location, data previously stored at said predetermined data storage device data storage location, and a previously calculated data integrity value.

5. A method of computing a data integrity value for a disk drive system having a plurality of data storage devices, each said data storage device including a data integrity value generator, responsive to first and second data elements, for calculating a data integrity value, comprising the steps of:

connecting each data storage device to a central disk drive controller, receiving, by a first data storage device from said central controller, said first data element; and determining said data integrity value using said data integrity value generator of said first data storage device, in response to at least said received first data element and said second data element stored on said first data storage device.

6. The method of claim 5, wherein said second data element stored on said first data storage device is stored a a predetermined data storage device data storage location to which said received first data element is to be written and stored.

7. The method of claim 5, wherein said integrity value generator is an "EXCLUSIVE-OR" generator.

8. The method of claim 5, wherein said first and second data elements are selected from the group consisting of:

received data to be stored on a data storage device, calculated data to be stored at a predetermined data storage device data storage location, data previously stored at said predetermined data storage device data storage location, and a previously calculated data integrity value.

9. A data storage system comprising:

a data storage device controller for receiving data elements; and a plurality of data storage devices, each said data storage device coupled to said data storage device controller and including a data integrity value generator, said data integrity value generator of each data storage device responsive at least to one data element stored at a predetermined data storage device data storage location on said data storage device and a data element to be stored at said predetermined data storage device data storage location on said data storage device, for calculating a data integrity value.

10. The system of claim 9, wherein each said data storage device can store said calculated data integrity value.

11. The system of claim 9, wherein each said data storage device can provide said determined data integrity value to said data storage device controller.

12. The system of claim 9, wherein each said data integrity value generator is an "EXCLUSIVE-OR" generator.

13. A method of computing data integrity values on a data storage system having a data storage device controller, for receiving data elements and a plurality of data storage devices, said method comprising the steps of:

coupling each of said plurality of data storage devices to said data storage device controller, including a data integrity value generator in each.- said data storage device, and determining a data integrity value using said generator from at least one data element stored at a predetermined data storage device data storage location on said data storage device and at least one data element to be stored at said predetermined data storage device data storage location on said data storage devices.

14. The method of claim 13 further comprising the steps of:

receiving a first data element to be stored at a predetermined data storage device data storage location on a first one of said plurality of data storage devices;

determining, using said first one of said plurality of data storage devices, a first data integrity value in response to said at least one data element to be stored at said predetermined data storage device data storage location on said first one of said plurality of data storage devices and at least one data element stored at said predetermined data storage device data storage location on said first one of said plurality of data storage devices;

storing said received at least one data element at said predetermined data storage device data storage location on said first one of said plurality of data storage devices;

providing said calculated first data integrity value to a second one of said plurality of data storage devices;

determining a second data integrity value by said second one of said plurality of data storage devices in response to said first data integrity value received from said first one of said plurality of data storage devices and a previously calculated data integrity value stored at a predetermined data storage device data storage location on said second one of said plurality of data storage devices; and storing said calculated new data integrity value on said second one of said plurality of data storage devices.

* * * * *